United States Patent [19]
Bargain

[11] 3,948,861
[45] Apr. 6, 1976

[54] POLYAMIDE-IMIDES FROM BIS-IMIDE AND DIALDOXIME

[75] Inventor: Michel Bargain, Lyon, France

[73] Assignee: Rhone-Poulenc S.A., Paris, France

[22] Filed: Nov. 16, 1973

[21] Appl. No.: 416,431

[30] Foreign Application Priority Data
Nov. 21, 1972 France .................. 72.41271

[52] U.S. Cl. .... 260/78 UA; 260/47 UA; 260/47 CZ; 260/65; 260/67.5; 260/72 R; 260/72.5; 428/474
[51] Int. Cl.² ........................................ C08L 69/00
[58] Field of Search....... 260/78 UA, 47 CZ, 47 UA

[56] References Cited
UNITED STATES PATENTS

| | | | |
|---|---|---|---|
| 2,346,665 | 4/1944 | Cupery | 260/78 R |
| 3,533,996 | 10/1970 | Grundschober et al. | 260/78 UA |
| 3,562,223 | 2/1971 | Bargain et al. | 260/78 UA |

Primary Examiner—Harold D. Anderson
Attorney, Agent, or Firm—Stevens, Davis, Miller & Mosher

[57] ABSTRACT

Polyamide-imides are produced by heating a mixture comprising:
a. a dialdoxime of the formula

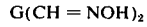

in which G represents a valency bond or a divalent organic radical possessing between 1 and 24 carbon atoms, and
b. a bis-imide of the formula

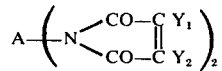

in which A represents a divalent organic radical possessing at least 2 carbon atoms, and $Y_1$ and $Y_2$ represent H, $CH_3$ or Cl, 0.5 to 50 mols of bis-imide being used per mol of dialdoxime.

15 Claims, No Drawings

POLYAMIDE-IMIDES FROM BIS-IMIDE AND DIALDOXIME

The present invention relates to polyamide-imides.

Polymers which simultaneously contain amide groups and imide groups have already been described; they have been obtained by reacting tricarboxylic acids, their chlorides or anhydrides with diamines, di-isocyanates or dicarbamates. It is also known[see, for example, Gazz. Chim. It. 481 (1937) La parola] that benzaldoxime reacts with maleic anhydride to yield benzoylamino-succinic acid.

The polyamide-imides according to the present invention are characterised in that they consist essentially of molecules and/or recurring units of the general formula:

(I)

in which: A denotes a divalent organic radical possessing at least 2 carbon atoms,

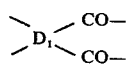

denotes a radical of the general formula

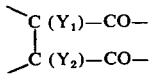

in which each of $Y_1$ and $Y_2$, which may be identical or different, represents H, $CH_3$ or Cl, $n$ is 0 or 1, G denotes a divalent organic radical with 1 to 24 carbon atoms, $a$ which can vary from molecule to molecule is a whole number, said number being from 1 to 12, or zero in some of the molecules, and each of $T_1$ and $T_2$, which may be identical or different, represents a radical of the formula:

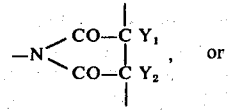

a radical of the formula:

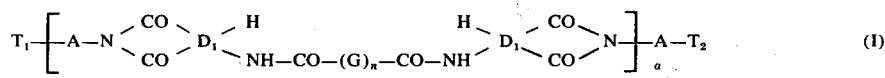 , or a radical of the formula:

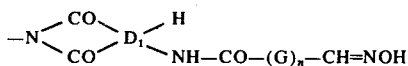

in which formulae $Y_1$, $Y_2$, $D_1$, $n$ and G are as defined above, 0.5 to 50 radicals $>N — A — N<$ being present per radical G.

The polyamide-imides according to the invention can also comprise units and/or molecules of the general formula:

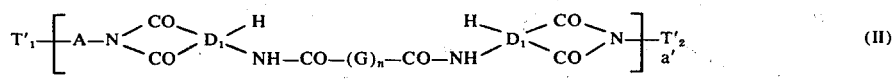
(II)

in which A, $D_1$, n and G are as defined above, $a'$ is as defined under $a$, $T'_1$ represents a radical of the formula:

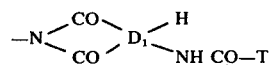

wherein T represents a monovalent organic radical, or a radical of the formula:

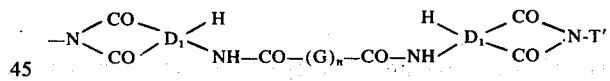

wherein T' represents a monovalent organic radical, each T and T' radical being identical or different, and $T'_2$ represents one of the radicals which T, $AT_1$ or $AT'_1$ can represent, at most 30 radicals T being present per 100 radicals A and/or at most 30 radicals T' being present per 100 radicals G.

The symbol A suitably denotes an alkylene radical with less than 13 carbon atoms, a phenylene radical, a cyclohexylene radical, one of the radicals of the formulae:

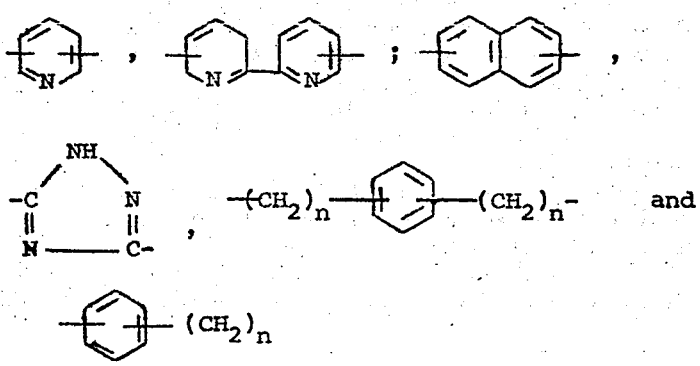

wherein n represents an integer from 1 to 3, or a divalent radical with 12 to 30 carbon atoms consisting of phenylene or cyclohexylene radicals bonded to one another by a simple valency bond or by an inert atom or group such as —O—, —S—, an alkylene group with 1 to 3 carbon atoms, —CO—, —SO₂—, —NR₁—, —N=N—, —CONH—, —COO—, —P(O)R₁—, —CONH—X—NHCO—, —N=N(→ O)—, or phenyl-alkenyl radical with 7 to 11 carbon atoms, a monocyclic or bicyclic heterocyclic radical containing at least one O, N or S atom such as methylene-3,4-dioxy-phenyl, pyridyl, dipyridyl and benzothienyl, a monovalent radical consisting of a phenyl radical and a phenylene radical bonded to one another by a simple valency bond or by an inert atom or group such as —O—, —S—, an alkylene radical with 1 to 3 carbon

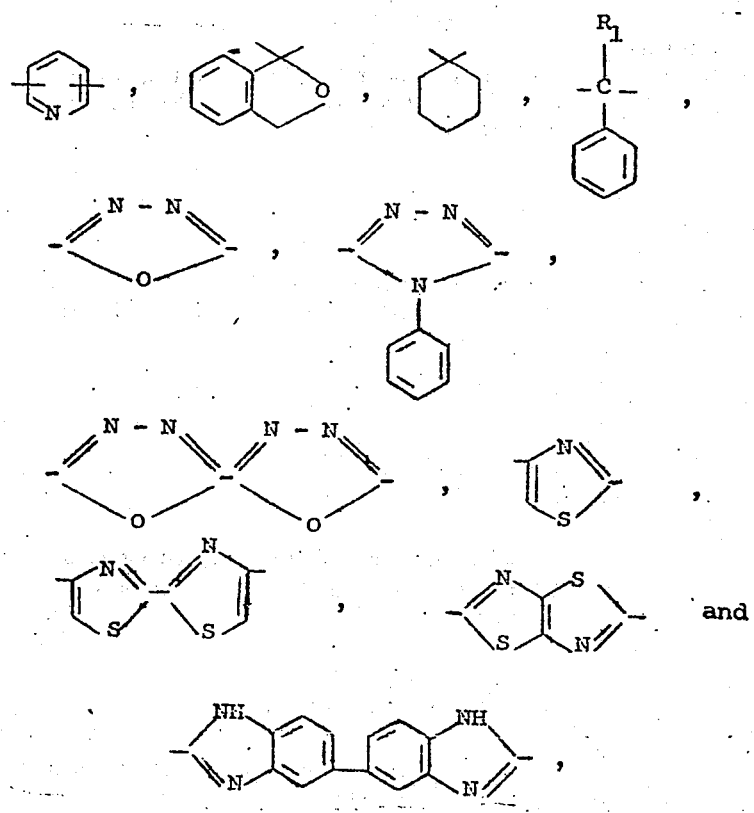

wherein R₁ represents a hydrogen atom, an alkyl radical with 1 to 4 carbon atoms, a phenyl radical or a cyclohexyl radical, and X represents an alkylene radical with less than 13 carbon atoms; the various phenylene or cyclohexylene radicals can be substituted by, for example, methyl groups.

The symbol G can be aliphatic, alicyclic or aromatic carbo- or hetero-cyclic. These radicals can be substituted by atoms such as F, Cl or Br, or groups such as NO₂, CH₃, OCH₃ or phenolic OH. More precisely, G can be an alkylene radical with 1 to 12 carbon atoms, alkenylene radical with 2 to 12 carbon atoms, cycloalkylene or cycloalkenylene radical with 5 to 12 carbon atoms, a phenylene, diphenylene, terphenylene, naphthylene or pyridinediyl radical or a divalent radical containing several benzene rings bonded to one another by an inert atom or group such as —O—, —S—, —NH—, —N(CH₃)—, —CH₂—, —C(CH₃)₂—, —SO₂—, —C(O)O—, —CONH—, —N=N— and —N=N(→ O)—.

The symbols T and T' can represent, for example, an alkyl or alkenyl radical with 1 to 18 carbon atoms, a phenyl, naphthyl, cycloalkyl or cycloalkenyl radical with 5 to 12 carbon atoms, an alkylphenyl or alkenylphenyl radical with 7 to 11 carbon atoms a phenyl-alkyl atoms, —CO—, —SO₂—, —NR₁—, —N=N(→ O)—, —N=N—, —CONH— and —COO—, wherein R₁ is as defined above, or an alkyl or alkenyl radical with 1 to 4 carbon atoms substituted by a heterocyclic radical such as one of those mentioned above. Moreover, the rings belonging to these various radicals can be substituted by inert atoms, radicals or groups such as F, Cl, Br, NO₂, phenolic hydroxyl or alkyl or alkoxy with 1 to 6 carbon atoms.

The polyamide-imides of the present invention can be prepared by heating, at 50°C to 300°C, a mixture comprising: a dialdoxime of the general formula:

in which G is as defined above, and a bis-imide of the general formula:

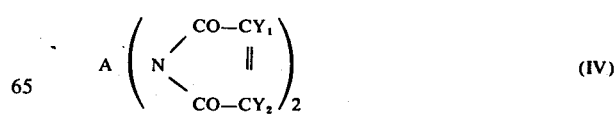

in which A, Y₁ and Y₂ are as defined above, in amounts such that the ratio of the number of mols of bis-imide to the number of mols of dialdoxime is from 0.5 to 50.

The polymers which contain in addition molecules and/or units (II) can be prepared by heating, from 50°C to 300°C, a mixture comprising, in addition to the dialdoxime (III) and the bis-imide (IV) in the specified proportions, a mono-imide of the general formula:

and/or an aldoxime of the general formula:

in which T and T' are as defined above, in amounts such that there are at most 30 mols of mono-imide (V) per 100 mols of bis-imide (IV) and/or 30 mols of aldoxime (VI) per 100 mols of dialdoxime (III).

It is to be understood that it is possible to use a mixture of aldoximes of formula (III), on the one hand, and of formula (VI) on the other hand and that, in the same way this remark applies to the imides of formulae (IV) and (V).

The dialdoximes which can be used can be considered to be derived from organic compounds which possess two aldehyde groups. Amongst these dialdoximes, those which are derived from saturated or unsaturated aliphatic dialdehydes may be mentioned in particular, such as glyoxal, malonaldehyde, succinaldehyde, glutaraldehyde, adipaldehyde, pimelaldehyde, suberaldehyde, azelaldehyde, sebacaldehyde, dodecanedial, cyclohexane-1,4-dihexanal, fumaraldehyde, malealdehyde, citraconaldehyde, 2-pentene-dial, 2-hexene-dial, 3-hexene-dial, butyne-dial and 5-(1,3-butadienyl)-2-heptene-dial. Aromatic dialdehydes from which the dialdoximes may be derived include phthalaldehyde, isophthalaldehyde, terephthalaldehyde, naphthalene-1,2-dicarbaldehyde, naphthalene-1,3-dicarbaldehyde, naphthalene-2,5-dicarbaldehyde, diphenyl-4,4-dicarbaldehyde, diphenyl-2,6-dicarbaldehyde, p-terphenyl-2,2''-dicarbaldehyde, m-terphenyl-2,6'-dicarbaldehyde, p-terphenyl-4,4'''-dicarbaldehyde, p-terphenyl-3,3''-dicarbaldehyde, o-terphenyl-2,6-dicarbaldehyde, 5,5'-methylene-bis-salicylaldehyde, 4,4'-diformyl-diphenyl ether, 4,4'-diformyl-diphenylamine, 4,4'-diformyl-diphenyl thioether, 4,4'-diformyl-diphenylmethane, 4,4'-diformyl-diphenylisopropane, 4,4'-diformyl-diphenylsulphone, 4,4'-diformyl-benzophenone, 4,4'-diformyl-azobenzene, phenyl 4,4'-diformyl-benzoate, 4,4'-diformyl-azoxybenzene and 2,6-diformyl-pyridine.

Nitromalonaldehyde and dibromosuccinaldehyde may also be mentioned.

When the dialdehydes exist in the polymeric state the latter can advantageously be used in the place of the monomer for the preparation of dioximes.

Specific examples of monoximes of formula (VI) which can be used include benzaldoxime, p-methyl-benzaldoxime, p-nitrobenzaldoxime, p-methoxybenzaldoxime, p-chlorobenzaldoxime, m-nitrobenzaldoxime, 2,6-dimethyl-4-bromo-benzaldoxime, isonicotin-aldehyde-oxime, piperonaldoxime, 4-methyl-3-nitro-benzaldoxime, isovaleraldoxime, p-(tertiary butyl)-benzaldoxime, 1-cyclo-pentenyl-formaldoxime, cinnamaldoxime, 3-ethoxy-4-hydroxy-benzaldoxime, 1-hydroxy-2-naphthaldoxime, salicylaldoxime and anisaldoxime.

The following may be mentioned by way of specific examples of bis-imides of formula (IV): N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylylene-bis-maleimide, N,N'-4,4'-diphenylmethane-bis-maleimide, N,N'-4,4'-(diphenyl ether)-bis-maleimide, N,N'-4,4'-diphenylsulphone-bis-maleimide, N,N'-4,4'-dicyclohexylmethane-bis-maleimide, N,N'-α,α'-4,4'-dimethylene-cyclohexane-bis-maleimide, N,N'-meta-xylylene-bis-maleimide, N,N'-para-xylylene-bis-dichloromaleimide, N,N'-4,4'-(1,1-diphenyl-cyclohexane)-bis-maleimide, N,N'-4,4'-diphenylmethane-bis-citraconimide, N,N'-4,4'-diphenylmethane-bis-chloromaleimide, N,N'-4,4'-(1,1-diphenyl-propane)-bis-maleimide, N,N'-4,4'-(1,1,1-triphenyl-ethane)-bis-maleimide, N,N'-4,4'-triphenyl-methane-bis-maleimide and N,N'-3,5-(1,2,4-triazole)-bis-maleimide.

These bis-imides can be prepared by applying the methods described, in for example, U.S. Pat. No. 3,018,290 and British patent specification No. 1,137,592.

Specific examples of mono-imides of formula (V) which can be used include N-phenylmaleimide, N-phenylmethyl-maleimide, N-phenyl-chloromaleimide, N-p-chlorophenyl-maleimide, N-p-methoxyphenyl-maleimide, N-p-methylphenyl-maleimide, N-p-nitro phenyl-maleimide, N-p-phenoxyphenyl-maleimide, N-p-phenylaminophenyl-maleimide, N-p-phenoxycarbonylphenyl-maleimide and N-p-phenylcarbonylphenyl-maleimide.

These mono-imides can be prepared by applying the method described, in for example, U.S. Pat. No. 2,444,536 for the preparation of N-aryl-maleimide.

The polyamide-imides according to the invention can be prepared in bulk by heating a mixture of the dialdoxime, the bis-imide and, optionally, the mono-imide and/or the monoaldoxime, at least until a homogeneous liquid is obtained; hereafter this mixture will be denoted by the expression "mixture of reagents". It is advantageous to effect a prior homogenising of the mixture of reagents.

The polyamide-imides of this invention can also be prepared by heating the reagents in a diluent which is liquid in at least a part of the range 50°–300°C. Amongst these diluents, polar organic solvents such as dimethylformamide, N-methylpyrrolidone, dimethylacetamide, N-methylcaprolactam, diethylformamide, N-acetylpyrrolidone and cresols may be mentioned in particular. The solutions of polyamide-imides can be employed directly for many uses. It is however also possible to isolate the polyamide-imides from solution by precipitation with a diluent which is miscible with the polar solvent and which does not dissolve the polyamide-imides; water or a hydrocarbon, the boiling point of which does not greatly exceed 120°C, can be used advantageously as the diluent.

The polyamide-imides can be prepared in the presence of a free radical inhibitor such as one of those discussed in "Encyclopedia of Polymer Science and Technology", volume 7, p. 644 to 662.

Those polyamide-imides in which the ratio of the number of radicals >N — A — N< to the number of radicals G is at least equal to 0.75, preferably from 1 to 10, are particularly valuable. In order to produce these polyamide-imides, the reagents are used in proportions such that, independently of the other reagents which might be present, there is at least 0.75 mol and preferably 1 to 10 mols of bis-imide per mol of dialdoxime.

It is to be understood that the properties of the polyamide-imides according to the invention can vary to a very large extent depending on the nature of the reagents used, of the proportions chosen and of the precise temperature conditions adopted.

In connection with the polyamide-imides for which the ratio of the number of radicals >N — A— N< to the number of radicals —G— ranges from 1 to 10, in particular, these can be cured polymers which are insoluble in the usual solvents and do not undergo significant softening below the temperature at which they start to degrade. However, these polyamide-imides can also be in the form of prepolymers which are soluble in polar organic solvents and which have a softening point at a temperature below 250°C. These prepolymers can be produced in bulk, by heating the mixture of reagents until a homogeneous liquid or paste-like product is obtained, at a temperature which is generally from 50° to 180°C. The prepolymers can also be prepared in suspension or in solution in a diluent which is liquid in at least a part of the range 50° to 180°C, preferably in a polar organic solvent.

The prepolymers can be used as a liquid mass, a simple hot-casting procedure being sufficient to shape them. It is also possible, after cooling and grinding, to use them in the form of powders which are extremely suitable for compression moulding operations, optionally in the presence of fillers in the form of, for example, powders, spheres, granules, fibres or flakes. In the form of suspensions or solutions, the prepolymers can be used for the production of coatings and of intermediate preimpregnated articles, the reinforcement of which can consist of fibrous materials such as aluminium or zirconium silicate or oxide, carbon, graphite, boron, asbestos or glass.

In a second stage, the prepolymers can be cured by heating to temperatures of the order of 350°C, generally from 150° to 300°C; a supplementary shaping can be effected during the curing, optionally in vacuo or at a pressure above atmospheric pressure, it being possible for these operations to be consecutive. The curing can be carried out in the presence of a radical polymerisition initiator such as lauroyl peroxide and azo-bis-isobutyronitrile, or of an anionic polymerisation catalyst such as diazabicyclooctane.

The polyamide-imides according to the invention can also comprise, by way of an adjuvant, an aromatic compound (AR) possessing 2 to 4 benzene rings, which does not sublime at atmospheric pressure up to 250°C and has a boiling point above 250°C; the addition of these aromatic compounds to the prepolymers is particularly useful because a lowering of the softening point of the prepolymer generally results. The aromatic compounds which are suitable are described in French Pat. No. 2,046,025.

The polyamide-imides according to the invention can also be modified by the addition, before curing, of a monomer (M) which is other than an imide and which contains at least one polymerisable —CH = C< group which can be of the vinyl, maleic, allyl and acrylic type. The monomers can possess several —CH = C< groups, but the double bonds must not be in a conjugated position. In one and the same monomer, these groups can belong to one and the same type or they can be of different types. It is possible to employ one monomer of a given formula or a mixture of copolymerisable monomers. The monomers which can be used are mentioned in French Pat. No. 2,094,607.

The monomer (M) can be added to the prepolymer or can be introduced into the mixture at any time during the course of the latter's preparation. The amount used should be less than 50%, and preferably from 5 to 40%, by weight of the weight of prepolymer or prepolymer mixture. The curing of the prepolymer modified by the monomer (M) can be carried out in the same manner as if it were not modified.

The polyamide-imides according to the invention can also be modified by the addition, before curing, of an unsaturated polyester, such as those described in French Pat. No. 2,102,796. The conditions relating to the introduction and to the amounts of unsaturated polyester as well as to the curing to yield resins are substantially the same as those for the addition of a monomer (M).

The incorporation of a monomer (M) or of an unsaturated polyester into the prepolymer gives rise to curable mixtures which can be used as impregnation resins; after adding fillers, they can be employed as coating compositions.

The polyamide-imides according to the invention are of particular value in industries which require materials possessing good mechanical and electrical properties as well as great chemical inertness at temperatures of 200°C to 300°C. By way of example, they are thus suitable for the manufacture of plate or tubular insulators for electrical transformers, printed circuits, gearwheels, and self-lubricating collars and stops.

The following Examples further illustrate the present invention.

EXAMPLE 1

34.3 g of N,N'-4,4'-diphenylmethane-bis-maleimide and 15.75 g of oxime of 4,4'-diformyl-benzene are dissolved in 58.25 g of N-methylpyrrolidone. 69 mg of hydroquinone are added to this solution and the whole is then heated at 100°C for 30 minutes.

Three samples (30 cm × 45 cm) of a glass fabric of the satin type which has previously been thermally desized and then treated with gamma-amino-propyl-triethoxysilane, are coated, in a single operation, with 68.1 g of the solution thus obtained; the glass fabric weighs 308 g/m$^2$. The coated samples of fabric are dried at 80°C for 1 hour under reduced pressure (400 mm/Hg) and then for a further hour at this temperature, also under reduced pressure (5 mm/Hg). 16 samples (15 cm × 15 cm) are then cut out of this coated and dried fabric and stacked to form a laminate. This combination is compressed under 30 bars for 30 minutes at 125°C and then the temperature is raised gradually to 200°C and the laminate kept at this temperature for 1 hour.

After release from the mould, the laminate is heated at 200°C for 24 hours, and then at 250°C for the same period. After cooling to 25°C, it possesses the following properties:

Resin content: 16%
Flexural breaking strength:
    Initial    60 kg/mm$^2$
    After 650 hours at 250°C:    30.1 kg/mm$^2$
    After 170 hours at 300°C:    29.6 kg/mm$^2$.
(Span 50 mm).

EXAMPLE 2

17.9 g of N,N'-4,4'-diphenylmethane-bis-maleimide, 4.1 g of oxime of 4,4'-diformyl-benzene and 18 mg of hydroquinone are mixed intimately. 10 g of this mixture are introduced into a parallelepiped mould (125 mm × 6 mm × 12.5 mm). The mould is placed between the platens of a press which have previously been heated to and kept at 130°C.

When thermal equilibrium has been achieved, slight pressure, the so-called contact pressure (about 20 bars), is applied and then the whole is heated gradually to 160°C over 15 minutes. The pressure is raised to 100 bars, and the whole is heated to 200°C and kept at this temperature for 1 hour. After being released from the mould whilst hot, the article is heated further at 200°C for 50 hours and then at 250°C for 45 hours.

After cooling, it has a flexural breaking strength of 13.6 kg/mm² at 25°C. After 932 hours at 250°C, its strength is still 8.3 kg/mm².

EXAMPLE 3

21.48 g of N,N'-4,4'-diphenylmethane-bis-maleimide are mixed intimately with 3.28 g of oxime of 4,4'-diformyl-benzene. 0.75 g of pulverulent graphite, the average size of the particles of which is of the order of 5 μ, is added to 10 g of this mixture, and then the mixture obtained is homogenised carefully. The latter is introduced into the mould described in Example 2 and the whole is placed between the platens of a press which have previously been heated to 200°C, and then a contact pressure is applied. When the temperature inside the mould reaches 170°C, a pressure of 100 bars is applied and the temperature is then raised gradually to 200°C. The whole is finally kept at this temperature for 1 hour.

After being released from the mould whilst hot, the article is heated further at 200°C for 97 hours and then at 250°C for 48 hours.

After cooling, it has a flexural breaking strength of 11.4 kg/mm² at 25°C. (Span: 25.4 mm).

EXAMPLE 4 a. A mixture containing 57.28 g of N,N'-4,4'-diphenyl-methane-bis-maleimide and 6.56 g of oxime of 4,4'-diformyl-benzene is heated at 160°C for 6 minutes.

After cooling, the product obtained is finely ground (average diameter of the particles: 60 μ) and 10 g of it are introduced into the parallelepiped mould described in Example 1. Moulding is carried out under the conditions described in Example 3, the pressure of 100 bars being established when the temperature inside the mould reaches 140°C. After being released from the mould whilst hot, the article is heated further at 250°C for 80 hours.

After cooling, it has a flexural breaking strength of 12.2 kg/mm² at 25°C. After 600 hours at 250°C, this strength is still 12.3 kg/mm². (Span: 25.4 mm).

b. 4 g of the powder obtained in Example 4 (a) are mixed intimately, after prepolymerisation, with 16 g of pulverulent graphite, and then moulding is carried out under the conditions described in Example 4 (a).

After being released from the mould whilst hot, the article is heated further at 200°C for 24 hours and then at 250°C for 40 hours.

After cooling, it has a flexural breaking strength of 7.2 kg/mm² at 25°C.

I claim:

1. A polyamide-imide heat-curable to a heat-resistant polymer having great chemical inertness at temperatures of 200° to 300°C, said polyamide-imide consisting essentially of molecules consisting essentially of the formula:

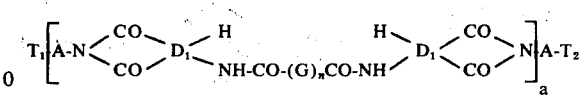

in which A denotes a divalent organic radical possessing at least 2 carbon atoms,

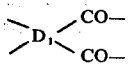

denotes a radical of the formula:

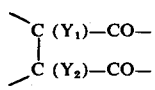

in which each of $Y_1$ and $Y_2$, which may be identical or different, represents H, $CH_3$ or Cl, $n$ is 0 or 1, G denotes a divalent organic radical with 1 to 24 carbon atoms, $a$ which can vary from molecule to molecule is a whole number, said number being from 1 to 12, or zero in some of the molecules, each of $T_1$ and $T_2$, which may be identical or different, denotes a radical of one of the formulae:

and

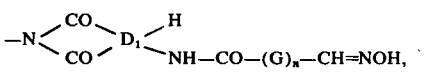

in which $Y_1$, $Y_2$, $D_1$, $n$ and G are as defined above, 0.5 to 50 radicals >N — A — N< being present per radical G.

2. A polyamide-imide according to claim 1 which contains at least 0.75 radicals >N — A — N< per radical G.

3. A polyamide-imide according to claim 1 which contains 1 to 10 radicals >N — A — N< per radical G.

4. A polyamide-imide according to claim 1 in which A represents

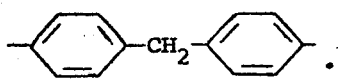

5. A polyamide-imide according to claim 1 in which A represents

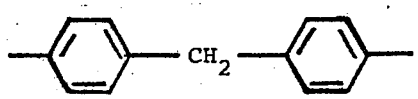

and G represents a diphenylene radical.

6. A polyamide-imide according to claim 1 in which A represents a radical selected from an alkylene radical with less than 13 carbon atoms, a phenylene radical, a cyclohexylene radical, a radical of the formula:

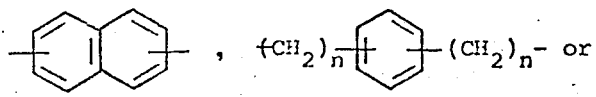 , 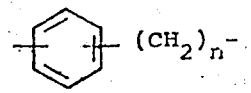 or wherein n represents an integer from 1 to 3, or a divalent radical with 12 to 30 carbon atoms consisting of phenylene or cyclohexylene radicals bonded to one another by —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO, —N=N(→ O)—,

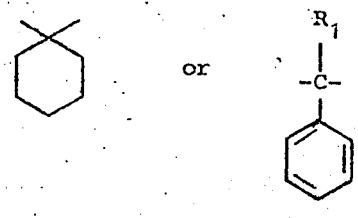

wherein R$_1$ represents a hydrogen atom, an alkyl radical with 1 to 4 carbon atoms, a phenyl radical or a cyclohexyl radical, and X represents an alkylene radical with less than 13 carbon atoms, or a said phenylene or cyclohexylene radical substituted by methyl groups.

7. A polyamide-imide according to claim 1 in which G represents a radical selected from an alkylene radical with 1 to 12 carbon atoms, alkenylene radical with 2 to 12 carbon atoms, cycloalkylene or cycloalkenylene radical with 5 to 12 carbon atoms, a phenylene, diphenylene, terphenylene or naphthylene radical or a divalent radical containing several benzene rings bonded to one another by —O—, —S—, —NH—, —N(CH$_3$)—, —CH$_2$—, —C(CH$_2$)$_2$—, —SO$_2$—, —C(O)O—, —CONH—, —N=N— and —N=N(→ O)—, said radicals optionally being substituted by F, Cl or Br, or NO$_2$, CH$_3$, OCH$_3$, or phenolic OH.

8. A polyamide-imide according to claim 1 which also contains molecules consisting essentially of the general formula:

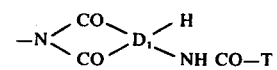

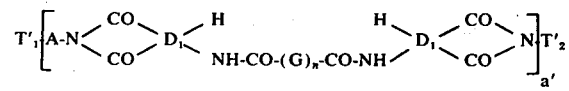

in which A, D$_1$, n and G are as defined in claim 1, $a'$ is as defined under $a$ in claim 1, T'$_1$ represents a radical of the formula:

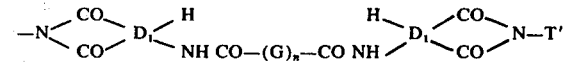

wherein T represents a monovalent organic radical, or a radical of the formula:

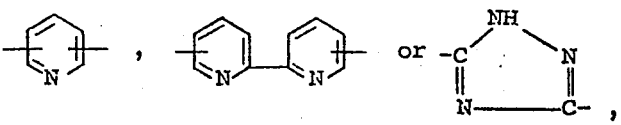

wherein T' represents a monovalent organic radical, which is the same as or different from T and T'$_2$ represents a radical as defined under T, AT$_1$ or AT'$_1$ at most 30 radicals T being present per 100 radicals A and/or at most 30 radicals T' being present per 100 radicals G.

9. A polyamide-imide according to claim 1 in which A represents a radical selected from a radical of the formula:

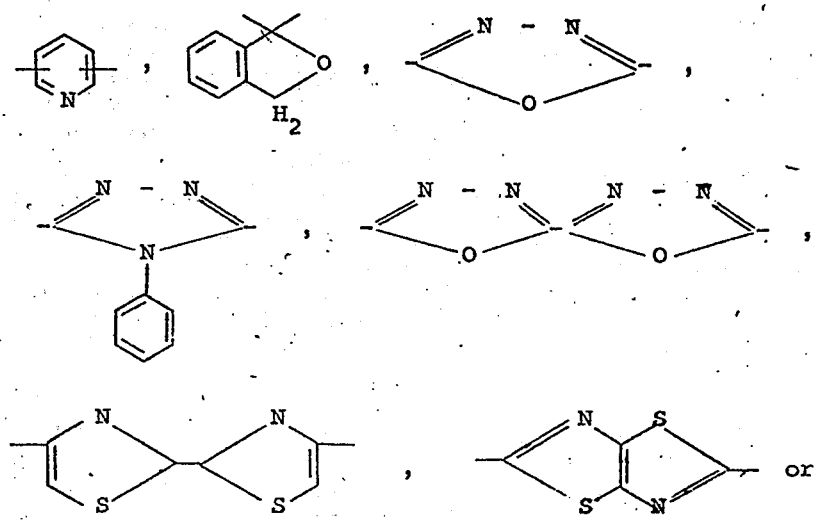

or a divalent radical with 12 to 30 carbon atoms consisting of phenylene or cyclohexylene radicals bonded to one another by

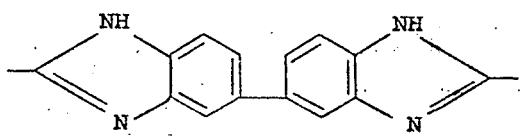

10. A polyamide-imide according to claim 1 in which G represents a phenylene radical.

11. A polyamide-imide according to claim 5 in which G represents a phenylene radical.

12. Process for the preparation of a polyamide-imide heat-curable to a heat-resistant polymer having great chemical inertness at a temperature of 200° to 300°C. which comprises heating at 50° to 300°C at least one dialdoxime of the general formula:

G (CH = NOH)$_2$     (III)

in which G denotes a divalent organic radical with 1 to 24 carbon atoms with at least one bis-imide of the general formula:

(IV)

in which A denotes a divalent organic radical possessing at least 2 carbon atoms, and each of $Y_1$ and $Y_2$, which may be identical or different, represents H, $CH_3$ or Cl, the ratio of the number of mols of bis-imide to the number of mols of dioxime being from 0.5 to 50.

13. Process according to claim 12, in which the molar ratio is at least 0.75.

14. Process according to claim 12, in which the molar ratio is from 1 to 10.

15. Process according to claim 12, in which a monoimide of the general formula

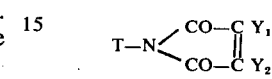

or a mono-aldoxime of the general formula T'—CH = N — OH, in which T and T' are as defined in claim 4 and $Y_1$ and $Y_2$ are as defined in claim 1, or a mixture thereof is also heated with the dialdoxime and bis-imide such that at most 30 mols of mono-imide are used per 100 mols of bis-imide and/or 30 mols of mono-aldoxime are used per 100 mols of dialdoxime.

* * * * *